United States Patent [19]

Kaye

[11] Patent Number: 4,792,081
[45] Date of Patent: Dec. 20, 1988

[54] EXTRUDED CONTAINER WITH DISSIMILAR METAL WELDING INSERT

[75] Inventor: Gordon E. Kaye, Garrison, N.Y.

[73] Assignee: Duracell Inc., Bethel, Conn.

[21] Appl. No.: 416,798

[22] Filed: Sep. 13, 1982

[51] Int. Cl.$^4$ ............................................. B23K 28/02
[52] U.S. Cl. ................................... 228/115; 228/175; 228/265
[58] Field of Search .................... 228/115, 176, 173 A, 228/173 R, 265, 136; 72/258, 267; 429/170; 29/505

[56] References Cited

U.S. PATENT DOCUMENTS

| | | | |
|---|---|---|---|
| 2,126,814 | 8/1938 | Rest | 29/505 |
| 2,701,483 | 2/1955 | Foxon et al. | 228/265 X |
| 3,041,718 | 7/1962 | Stuchbery | 228/265 |
| 3,222,761 | 12/1965 | Sabo | 72/258 X |
| 3,235,946 | 2/1966 | Neu et al. | 72/258 X |
| 3,489,266 | 1/1970 | Miller | 429/185 X |
| 4,008,845 | 2/1977 | Bleckmann | 29/505 X |
| 4,141,484 | 2/1979 | Hamilton et al. | 228/265 |
| 4,397,413 | 8/1983 | Wagner et al. | 228/176 X |
| 4,441,646 | 4/1984 | Wagner et al. | 228/265 X |

*Primary Examiner*—Kenneth J. Ramsey
*Attorney, Agent, or Firm*—Ronald S. Cornell; James B. McVeigh

[57] ABSTRACT

A novel method and apparatus for forming an aluminum container with an exposed metallic insert in the closed end thereof with the aluminum and the secondary metal being coextruded during forming of the container. A particularly synergetic combination is achieved by selecting a spherical insert member and providing concave or depressed region in the bottom of the extrusion die mold to partially receive the spherical element. The aluminum flows around the major diameter of the spherical insert during coextrusion but leaves a bottom portion of the insert exposed for external welding to another component.

1 Claim, 1 Drawing Sheet

EXTRUDED CONTAINER WITH DISSIMILAR METAL WELDING INSERT

BACKGROUND OF THE INVENTION

1. Field of the Invention

This invention relates to a method and apparatus for forming an aluminum can and, more particularly, pertains to a novel method and apparatus for forming an aluminum container which has a metallic insert incorporated into one end thereof.

The present inventive arrangement effectively provides a novel apparatus and method for providing a compatible welding surface at one end of an extruded aluminum container. A metallic insert is incorporated into an end of an extruded container by placing the insert into an extrusion die prior to extrusion. The present invention is particularly adapted for battery containers and, in particular, for providing a dissimilar welding surface for spot-welding intercell connectors to the extruded aluminum can.

2. Description of the Prior Art

It is well known that cans, particularly cans made of aluminum, can be formed by a variety of processes. One method for producing such a can which additionally has an integrally formed bottom wall, is by, shaping an aluminum sheet blank into a receptacle having a conical circumferential wall by using cooperating dies to squeeze and thin the central portion of the blank and simultaneously radially extruding the surplus metal into a receptacle configuration. This configuration is then placed on a mandrel having the desired inside dimensions of the can body. A spinning operation then takes place to further form the can to the desired shape. As disclosed in Fraze, U.S. Pat. No. 3,572,271, this method, although relatively complex, does produce cans having an integrally formed bottom wall.

Another method for producing cans, much simpler than the method previously described, is by extruding a metallic slug with a punch and die arrangement. Typically, a disc, or slug, normally consisting of aluminum, is placed into a die with a punch subsequently being forced into the die thereby causing extreme plastic deformation of the slug and extruding the slug into the shape of the die. As disclosed in Siemonsen, U.S. Pat. No. 3,232,260, this type of extrusion formation produces cans having a raw edge and an opposing end which is relatively flat. The methods described hereinabove, although successful in forming aluminum cans, do not address the particular problems to which the present invention is directed.

As is well known in the electrochemical battery art, spot welding of steel intercell connectors to battery cells which have an aluminum cell container is extremely difficult. Spot-welding of the intercell connectors, which are normally comprised of steel or similar metal, to the aluminum cell is inhibited by the aluminum oxide film inherently present on the surface of the aluminum container or housing. In order to effectively bond the intercell connector to the aluminum housing, the oxide film must be somehow removed prior to, or during, the welding operation.

In response to this need of attaching intercell connectors to an extruded aluminum battery cell, ultrasonic welding, a method well known in the prior art, has been adapted for use in the electrochemical battery cell art. To weld a metal intercell connector to the aluminum housing, the housing is first formed by any of the methods described hereinabove. In a secondary operation, which also requires the cell container to be totally empty of electrochemical components, the connector is ultrasonically welded to the base of the aluminum cell. A pressure mandrel is inserted within the aluminum cell housing to resist the force of the externally applied ultrasonic vibrations which vibrate the steel plate, which is to be welded thereto, and aluminum housing the vibrations causing the formation of an effective bond. Ultrasonic welding, considered to be a form of cold welding, applies vibratory energy to the container by a transducer which is arranged to produce shear vibrations at the interface of the parts to be welded. A solid-state bond occur by rupture of the aluminum oxide film and subsequent localized plastic deformation with interpenetration of the metals taking place.

However, the secondary ultrasonic welding operation greatly increases the per item cost of each unit so-produced because it is a time-consuming operation and additionally, because the cell itself must be prepared (i.e. the removal of all electrochemical components), and the entire method is considerably more complex and more lengthy than the more desirable spot-welding operation. Consequently, the present inventive concept provides a relatively simple solution to the problem of providing an integrally formed compatible welding surface to the aluminum housing to allow another metal, and particularly intercell connectors, to be easily and inexpensively spot welded to the aluminum can. None of the prior art, of which Oliver U.S. Pat. No. 2,490,598; Schaefer U.S. Pat. No. 3,981,743; and Jammet U.S. Pat. No. 3,433,681 are typical, show or even suggest the method and apparatus as described herein. Oliver, U.S. Pat. No. 2,490,598, is typically illustrative of spot welding a metal disc to a metal can. However, Oliver is completely silent with respect to the aforedescribed problems associated with the fabrication of aluminum containers.

Schaefer, U.S. Pat. No. 3,981, 743, discloses a lithium-aluminum negative electrode and a method for making same. The patent discloses a sandwich type configuration which is heat soaked while pressure is simultaneously applied to the aluminum-lithium-aluminum configuration thereby causing the lithium and aluminum to chemically react to form a lithium-aluminum alloy. Although Schaefer discloses the use of pressure to bond the dissimilar metals, the extrusion method of the instant invention is believed to be wholly different from this reference. Particularly, this reference is drawn to forming a particular type of electrode, a result to which the present invention is not directed. Further, there is no teaching of the particular problems associated with the spot welding of connectors to the aluminum cell of the battery.

Jammet, U.S. Pat. No. 3,433,681, discloses a typical leakproof electrochemical cell having a sealing cup compressed about the bottom of a metal cup to compensate for the expansion of the cell due to the exhaust gases released while the cell is active. Although not believed to be overly pertinent to the present invention, this reference is included to show the general state of the art related to electrochemical cells.

SUMMARY OF THE INVENTION

Accordingly, it is a primary objective of the present invention to provide a novel, improved method and apparatus for forming an aluminum cell housing having one end thereof incorporating therein a dissimilar metal insert to enable a steel intercell connector to be easily spot welded thereto.

The term "aluminum" herein shall be understood to include aluminum metal per se as well as alloys predominantly made up of aluminum. The term "intercell connector" defines a well known device which electrically connects two or more cells and is typically fabricated of steel for reasons of economy. The expression "dissimilar metal" as used herein refers to a metal other than aluminum or a metal alloy containing at most minor amounts of aluminum said metal or metal alloy being capable of being readily spot-welded to an intercell connector employing known and conventional techniques. Steel itself provides an excellent dissimilar metal insert in accordance with this invention when the intercell connector is made of steel.

Another object of the present invention is to incorporate a dissimilar metal into the aluminum housing during the extrusion process so as to provide a spot weldable surface on the aluminum housing without the requirement of any secondary treatment of the housing.

A further object of the present invention is to provide an aluminum battery cell which can easily and inexpensively have a metal disc weldable thereto.

Still, a further object of the present invention is to provide an improved configuration to the metal disc to be incorporated into the cell housing to facilitate the disc's permanent incorporation therein.

The present invention, unlike the prior art, provides a relatively simple and inexpensive process and apparatus for providing a dissimilar metal surface on the end of an extruded aluminum cell. A metal insert, normally specially designed, is placed in the extrusion die beneath the aluminum slug which is to be extruded. A punch is subsequently lowered into the die causing the aluminum to be extruded, and consequently the aluminum is caused to flow around, and in some cases through, the metal insert. This process effectively physically and chemically entraps and bonds the insert to the aluminum cell. The insert is incorporated into the cell, yet has a surface exposed and flush with the end of the can. An intercell connector can then easily be subsequently spot-welded to the exposed surface of the insert.

BRIEF DESCRIPTION OF THE DRAWINGS

The foregoing and other objects, advantages and characterizing features of the inventive process and apparatus herein described will become more readily apparent from the following detailed description of a preferred embodiment thereof, taken in conjunction with the accompanying drawings wherein like reference numerals denote similar parts throughout the various views and in which.

DESCRIPTION OF THE PREFERRED EMBODIMENTS

Figure 1:
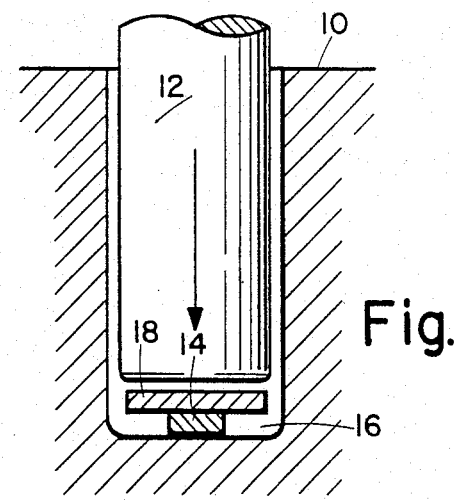
FIG. 1 is a partial side sectional view, of the configuration of the present invention showing the entirety of the components thereof.

Referring now in detail to the drawings, the present invention contemplates the use of an extrusion die 10, the structural details of which are not included herein because they are considered to be outside the scope of the present invention. FIG. 1 depicts the use of an extrusion die 10 and a forcing punch 12. Typically, a metal insert 14 is placed at the bottom 16 of the extrusion die 10 with an aluminum slug 18 positioned in spaced relation immediately thereabove. The metallic insert 14 is composed of a metal, e.g., steel, which can easily be spot-welded to another metal, such as an intercell connector. The forcing punch 12 is subsequently lowered into the extrusion die 10 thereby causing the aluminum slug 18 to plastically deform and flow around, and in some cases through, steel metal insert 14, thereby partially encapsulating and retaining said insert. The flow of the extruded aluminum material 18 inherently ruptures the aluminum oxide film formed on the aluminum slug 18 and consequently provides not only a physical bonding of metal insert 14 to extruded aluminum slug 18, which has been extruded into the form of an aluminum housing 20, but will also provide a chemical bond as well. After this severe deformation, which preferably occurs at higher than ambient temperature and pressure, the container and insert is cooled to permanently affix the insert to the container.

It should, of course, be realized that a number of different configurations can be given to the metal insert to ensure that a sufficient chemical and/or physical bond will occur between the insert and the extruded aluminum cell housing 20. The insert 14 need not be simply a thin punched disc, but may also be of sufficient thickness or shape to permit a flow of extruded aluminum around or through the outer edges or perforations which may be undercut in relation to the upper surface of the steel disc to permit a partial encapsulation or retention by virtue of the flow of aluminum into the undercut regions. It should also be realized that the insert can have undercuts on either side of the disc to further permit indifferent placement of the insert in the die. The typical inserts which are disclosed herein are considered merely as examples and are not to he construed as limiting the present invention in any way. In a preferred embodiment, the inserts are made of cold rolled steel.

Figure 2:
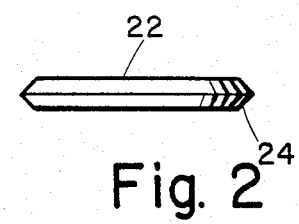
FIG. 2 is a side view of a typical disc used as the insert in the configuration of FIG. 1.
Figure 4:
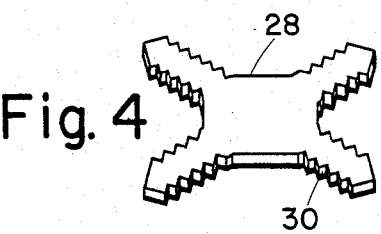
FIG. 4 is a perspective view of an insert having a star lock washer configuration.
Figure 5:
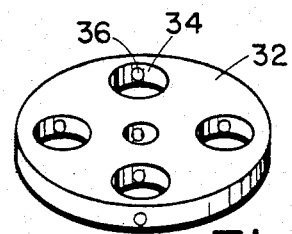
FIG. 5 is a perspective view of an insert having perforations which extend therethrough.
Figure 5A:
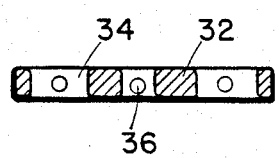
FIG. 5a is a cross-sectional view of another insert which can be used in the present invention.
Figure 7:
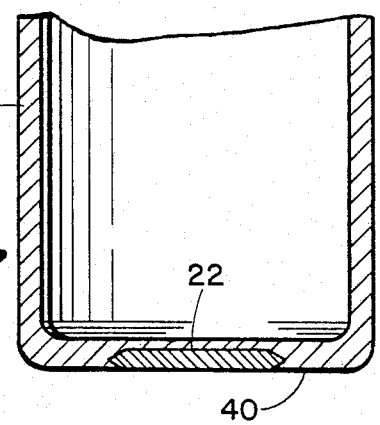
FIG. 7 is a side view in cross section of the aluminum cell housing having the metal insert of FIG. 2 bonded therein.

FIG. 2 discloses a metal insert 22 having ends 24 around which the extruded aluminum can easily flow to partially encapsulate the insert. This insert is also shown in FIG. 7 in its attached configuration to the extruded aluminum cell container 20. FIGS. 4 and 5 show other types of inserts which can be utilized in the present invention. FIG. 4 depicts a star lock washer insert 28 which has numerous cuts and edges which enables the deformed aluminum 18, to effectively chemically and physically bond the insert 28. FIGS. 5 and 5a show a disc insert 32 having openings 34 therein to allow the aluminum 18 to flow through the disc 32. The openings 34 are further provided with holes 36 which are cut into the disc 32 and radially extend into the disc transversely in respect to the openings 34. These holes 36 are provided to allow additional aluminum 18 to flow into and partially throughout the disc 32 in order to more firmly retain the insert 32 in the aluminum cell housing.

In another embodiment of the invention (not readily capable of being illustrated by a drawing and thus not shown) the disc is comprised of a pressed, sintered iron or steel powder metal insert in which the particle size and the pressing pressure are selected to provide sufficient porosity to permit intrusion of aluminum upon extrusion, whereby the aluminum becomes locked to the disc.

Figure 3:
FIG. 3 is a perspective view of an alternative shape of the metal insert.
Figure 6:
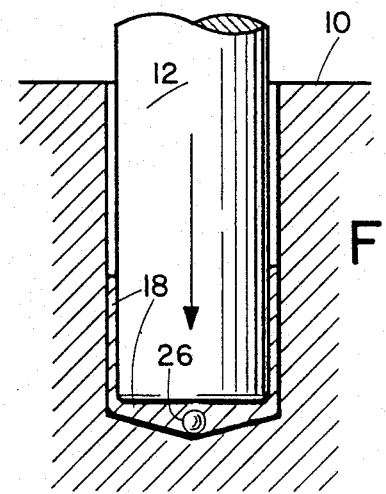
FIG. 6 is a partial cross sectional view of another configuration of the present invention which is normally used when the insert shown in FIG. 3 is used.

As an alternative embodiment of the present invention, FIG. 3 is a steel metal insert 26 which can also be used according to the teachings of the present invention. As shown in FIG. 6, the steel metal insert 26 is placed in a conical or centrally depressed region of the die, and will, accordingly, be positioned by the aluminum 18 flowing around the major diameter of the insert leaving only a small portion of the insert 26 protruding from the end of the container 20, with the remainder of the insert 26 being retained in the relatively thick bottom of the aluminum housing.

It should be realized that in all the embodiments of the present invention the inserts, after extrusion, have a surface 40 which is substantially flush with the end of the container so as to provide an even surface for easy spot welding of an intercell connector, or other metal, thereto.

From the foregoing, it is apparent that the objects of the present invention have been fully accomplished. As a result of the present invention, a novel apparatus and method for forming an aluminum cell housing with a dissimilar insert at one end thereof has been provided. Although a preferred embodiment of the principles of this invention has been described and illustrated in detail herein, it should be realized that the same are not limited to the particular configuration shown in the drawings, and that modifications thereof are contemplated and can be made without departing from the broad spirit and scope of this invention as defined in the appended claims.

What is claimed is:

1. A method for forming an aluminum container having a dissimilar metal insert inserted in the external surface thereof comprising:
    a. placing a solid spherical dissimilar metal insert in an extrusion die, said die having a conical or centrally depressed region therein;
    b. positioning an aluminum slug above said metal insert; and
    c. lowering a punch into the die so as to deform said aluminum slug into a container configuration; and
    d. also thereby causing the external surface of said aluminum container to bond to said dissimilar metal insert by deforming the aluminum so that it flows around a major diameter of the insert whereby the insert is chemically and physically bonded to the external surface of said aluminum container and wherein a portion of said metal insert is externally exposed for welding thereto.

* * * * *